United States Patent [19]
Kersey

[11] Patent Number: 5,227,857
[45] Date of Patent: Jul. 13, 1993

[54] SYSTEM FOR CANCELLING PHASE NOISE IN AN INTERFEROMETRIC FIBER OPTIC SENSOR ARRANGEMENT

[75] Inventor: Alan D. Kersey, Springfield, Va.

[73] Assignee: The United States of America as represented by the Secretary of the Navy, Washington, D.C.

[21] Appl. No.: 690,437

[22] Filed: Apr. 24, 1991

[51] Int. Cl.$^5$ .............................................. G01B 9/02
[52] U.S. Cl. ................................ 356/345; 250/227.27
[58] Field of Search ........................ 356/345, 349, 351; 250/227.19, 227.27

[56] References Cited

U.S. PATENT DOCUMENTS

| | | | |
|---|---|---|---|
| 4,609,290 | 9/1986 | Cahill | 356/351 |
| 4,830,486 | 5/1989 | Goodwin | 356/349 |
| 5,001,337 | 3/1991 | Homuth | 250/227.19 |

OTHER PUBLICATIONS

Publication. "Analysis of Input–Polarization–Induced Phase Noise in Interferometric Fiber-Optic Sensors and Its Reduction Using Polarization Scrambling", by Alan D. Kersey et al., *Journal of Lightwave Technology*, vol. 8, No. 6, Jun. 1990. pp. 838–845.

Publication, Novel Passive Phase Noise Cancelling Technique for Interferometric Fiber Optic Sensors, by A. D. Kersey and T. A. Berkoff, *Electronics Letters*, vol. 26, No. 10 (10 May 1990).

Primary Examiner—Samuel A. Turner
Attorney, Agent, or Firm—Thomas E. McDonnell; George Jameson

[57] ABSTRACT

A fiber optic sensor system for cancelling phase noise while it senses a measurand field is disclosed. The system includes circuitry for developing a light beam that is frequency modulated at a fundamental frequency. First and second unbalanced interferometers, having equal path imbalances, are responsive to the frequency modulated light beam for producing respective first and second optical outputs. Detection circuitry is responsive to the fundamental frequency, the second harmonic of the fundamental frequency, and the first and second optical outputs for producing a plurality of sine and cosine signals containing phase difference and phase noise components. A signal processor is responsive to the plurality of sine and cosine signals for cancelling the phase noise components and only producing output sine and cosine components of the difference in the phase shift between the first and second unbalanced interferometers. The system can further include a demodulator for demodulating the sine and cosine components to produce an output signal proportional to the phase shift difference between the first and second unbalanced interferometers.

19 Claims, 4 Drawing Sheets

SYSTEM FOR CANCELLING PHASE NOISE IN AN INTERFEROMETRIC FIBER OPTIC SENSOR ARRANGEMENT

BACKGROUND OF THE INVENTION

1. Field of the Invention

The present invention relates to sensors and particularly to a phase noise cancellation system for an interferometric fiber optic sensor arrangement.

2. Description of the Prior Art

Interferometric fiber optic sensors are highly sensitive devices for the measurement of weak time-varying measurand fields, such as acoustic pressure, vibration and magnetic fields. In order to achieve remote passive optical interrogation of fiber interferometers, a number of demodulation techniques based on phase generated carrier (PGC) concepts have been developed. These techniques utilize an unbalanced interferometer and laser frequency modulation to induce high-frequency phase shift 'carriers' in the interference output of the sensor, which are encoded by lower-frequency 'signal' phase shift information of interest. Both passive (sine-/cosine) homodyne and synthetic heterodyne techniques are possible. One problem which arises when using this form of demodulation approach is that of laser frequency-jitter induced phase noise. Due to the required use of an unbalanced interferometer for operation of the PGC demodulation, the interferometer is also inherently susceptible to laser frequency jitter (laser phase noise). This problem is well understood and characterized for a number of commonly used diode lasers.

In the standard prior art, phase generated carrier (PGC), passive homodyne system, signal dependent on the sine and cosine of the phase of an unbalanced sensor interferometer are fed to a differentiate and cross multiply demodulator which provides an output signal that contains both the time-varying phase difference between the arms of the sensor interferometer and phase noise due to laser emission frequency jitter. This phase noise typically limits the detection sensitivity of the prior art sensing system.

The emission frequency of a laser can be stabilized by locking it to a reference cavity, such as a Fabry-Perot interferometer. Such locking of the emission frequency of a laser can be used to greatly reduce low frequency phase noise. However, this technique can only be used with unmodulated lasers. To date, there is no prior art technique, known to applicant, for achieving phase noise reduction of a frequency modulated laser in a fiber optic interferometer system.

OBJECTS OF THE INVENTION

Accordingly, one object of the invention is to provide a passive phase noise cancelling system for an interferometric fiber optic sensor.

Another object of the invention is to provide a novel system for the cancellation of phase noise in a fiber interferometer due to laser frequency emission jitter.

A further object of the invention is to provide a system for achieving phase noise reduction of a frequency modulated laser in a fiber optic interferometer arrangement.

SUMMARY OF THE INVENTION

These and other objects of the invention are achieved by providing a phase noise cancelling system for an interferometric fiber optic sensor apparatus, which system comprises: circuitry for developing a light beam that is frequency modulated at a fundamental frequency; first and second unbalanced interferometers of equal path imbalance being responsive to the frequency modulated light beam for producing respective first and second optical outputs; detection circuitry responsive to the fundamental frequency, the second harmonic of the fundamental frequency, and the first and second optical outputs for producing a plurality of sine and cosine signals containing phase difference and phase noise components; and a signal processor responsive to the plurality of sine and cosine signals for cancelling the phase noise components and only producing output sine and cosine components of the difference in the phase shift between the first and second unbalanced interferometers. The phase noise cancelling system can further include a demodulator for demodulating the sine and cosine components to produce an output signal proportional to the phase shift difference between the first and second unbalanced interferometers.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE EMBODIMENTS OF THE INVENTION

Before the drawings are discussed, it should be noted that the system for cancelling phase noise in the interferometric fiber optic sensor system of the invention basically involves the use of an unbalanced sensor interferometer, an unbalanced "reference interferometer", and phase generated carrier (PGC) passive homodyne phase detection to obtain sine/cosine components from the interferometer outputs; and signal processing involving the cross-multiplication of the sine/cosine components to provide cancellation of the phase noise while only producing sine and cosine components of the difference in the phase shift between the two unbalanced interferometers.

Figure 1:
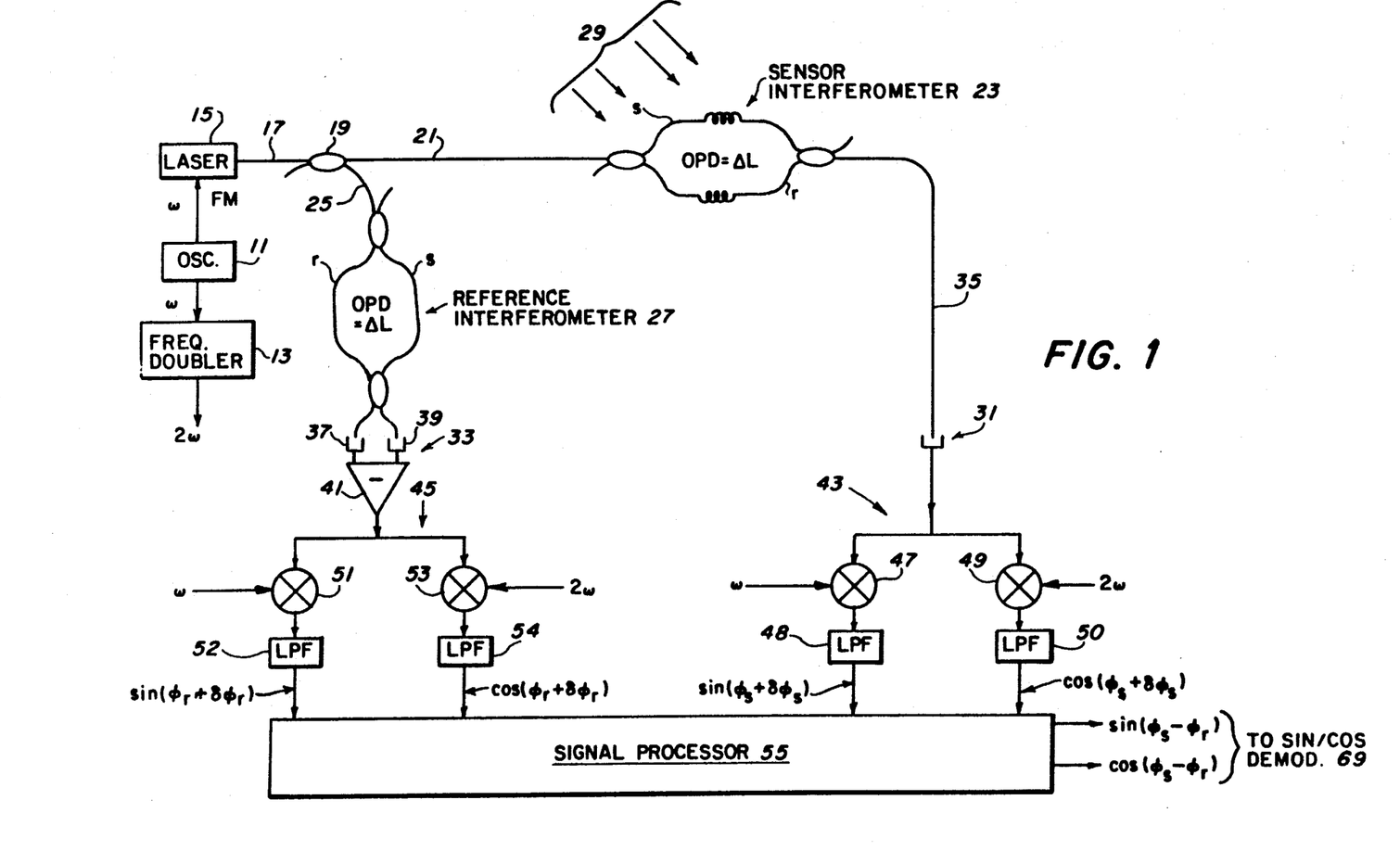
FIG. 1 is a schematic diagram of a first embodiment of the invention.

Referring now to FIG. 1, an oscillator 11 develops an output signal at a fundamental frequency $\omega$ which is applied to a frequency doubler 13 to develop a second harmonic $2\omega$ of the fundamental frequency $\omega$. The output signal from the oscillator 11 is also utilized to frequency modulate a laser 15 at the fundamental frequency $\omega$, causing the laser 15 to emit a frequency modulated (FM) light beam at the rate or frequency $\omega$.

The FM light beam from the laser 15 is applied by way of an optical fiber 17 to an optical coupler 19 which splits the light beam into first and second portions (not shown). The first portion of the light beam is transmitted through an optical fiber 21 to an input port of a remotely-positioned, unbalanced, fiber optic sensor interferometer 23, while the second portion of the light beam is transmitted through an optical fiber 25 to a locally-positioned, shielded, unbalanced, fiber optic reference interferometer 27. Each of the interferometers 23 and 27 is preferably a Mach Zehnder interferometer having sensor (s) and reference (r) arms or optical path lengths. However, it should be realized that other interferometer sensor configurations, such as a Michelson interferometer configuration, could also be used in place of the Mach Zehnder configuration. The optical path difference or OPD ($\Delta L$) between the arms s and r in sensor interferometer 23 is equal to the OPD ($\Delta L$) between the arms s and r in reference interferometer 27. The interferometers 23 and 27 do not have to be identical; they just need to have equal OPD's between their associated s and r arms.

The remotely-positioned, sensor interferometer 23 is exposed to a measurand field 29, such as an acoustic pressure or a magnetic field, which changes the optical path length of its s arm. However, the reference arm r, which is shielded to establish a reference with respect to its associated s arm, is unaffected by the measurand field 29. As a result, the sensor interferometer 23 produces an interference pattern, or optical interferometer signal, indicative of any sensed change in the measurand field 29. On the other hand, the shielded, locally-positioned, reference interferometer 27 is not affected by the measurand field 29, or by any other measurand field.

The interferometers 23 and 27 produce optical outputs which are respectively photodetected by detectors 31 and 33. Because the interferometer 23 is remotely located, it is preferable that the interferometer 23 utilize only the single input fiber 21 and a single output fiber 35, as shown in FIG. 1. As a result, the detector 31 preferably comprises a single-ended photodetector to detect the output of the interferometer 23 on the single output fiber 35 and produce an associated electrical output signal. Since the interferometer 27 is locally positioned, it is located in close proximity to the detector 33. As a result, both of the output ports of the interferometer 27 can be used to detect the output of the interferometer 27. Consequently, the detector 33 can be a balanced detector comprised or photodetectors 37 and 39 for respectively detecting the outputs from both of the output ports of the interferometer 27, and a combiner 41 for combining the two detected outputs from the interferometer 27 into one output signal. Of course, it should be understood that a single photodetector could be utilized to detect the optical output from only one of the output ports of the interferometer 27, as was done in relation to the interferometer 23.

The frequency modulation of the laser emission frequency of the laser 15 at the rate of $\omega$ gives rise to the generation of a optical phase shift carrier signal in both of the interferometers 23 and 27. The sensed environmental effect 29 places a signal modulation on the optical phase shift carrier in the sensor interferometer 23. In addition, the optical phase shift carrier signal in each of the interferometers 23 and 29 enables each associated one of the interferometers 23 and 29 to produce an optical output which, at the fundamental frequency $\omega$ and the second harmonic $2\omega$ of the fundamental frequency $\omega$, contains components of phase difference and phase noise terms. The components of phase difference terms for the sensor interferometer 23 are due to the OPD ($\Delta L$) of the interferometer 23 and to the stress imposed on the sensing (s) arm of the interferometer 23, whereas the components of phase difference terms for the reference interferometer 27 are due to the OPD ($\Delta L$) of the interferometer 27. The components of phase noise terms for the sensor interferometer 23 are substantially the same as those for the reference interferometer 27, since both of the interferometers 23 and 27 are substantially equally affected by the laser frequency-jitter induced phase noise produced by the laser 15.

At the output of the detector 31, the amplitudes of components at the fundamental ($\omega$) and second harmonic ($2\omega$) of the laser modulation frequency are given by:

$$S_s(\omega) = 2\eta I_o k_s J_1(\Delta\phi_o) \sin[\phi_s + \delta\phi_s] \quad (1)$$

$$S_s(2\omega) = 2\eta I_o k_s J_2(\Delta\phi_o) \cos[\phi_s + \delta\phi_s] \quad (2)$$

where:
subscript s refers to the sensing interferometer 23
$\phi_s$ is the time-varying phase difference between the arms s and r of the sensor interferometer 23, which is responsive to the sensed measurand field
$\delta\phi_s$ is the phase noise due to laser emission frequency jitter
$\eta$ is the detector responsivity (A/W) of detector 31
$I_o$ is the intensity of the laser 15
$k_s$ is a factor accounting for fringe visibility and loss At the output of the detector 33, the amplitudes of components at the fundamental ($\omega$) and second harmonic ($2\omega$) of the laser modulation frequency are given by:

$$S_r(\omega) = 2\eta I_o k_r J_1(\Delta\phi_o) \sin[\phi_r + \delta\phi_r] \quad (3)$$

$$S_r(2\omega) = 2\eta I_o k_r J_2(\Delta\phi_o) \cos[\phi_r + \delta\phi_r] \quad (4)$$

where
subscript r refers to reference interferometer 27
$\phi_r$ is the time-varying phase difference between the arms s and r of reference interferometer 27
$\delta\phi_r$ is the phase noise due to laser emission frequency jitter
$\eta$ is the detector responsivity (A/W) of detector 33
$I_o$ is the intensity of the laser 15
$k_r$ is a factor accounting for fringe visibility and loss As stated before, the laser 15 is modulated with a frequency carrier signal $\omega$ which modulates the wavelength or frequency of the laser 15. The oscillation rate of $\omega$ is, for example, 50 kilohertz (KHz) or higher. The amplitude of this laser FM modulation ($\omega$) is adjusted such that the phase shift induced in each of the sensor and reference interferometers 23 and 27 by the frequency modulation of the laser 15 is at an amplitude of approximately 2.6 radians peak.

Typically, this adjustment of the amplitude of the laser FM modulation can be achieved by, for example, using a diode laser (or an exemplary diode laser pumped Nd:YAG laser) as the laser 15, and modulating the injection current to the laser 15 at the fundamental frequency rate of $\omega$ to tune the laser emission frequency, and controlling the amplitude of the injection current to adjust the amplitude of the laser FM modulation. The amplitude of the laser FM modulation produces a frequency deviation in the output emission frequency of the laser 15. So the frequency deviation of the laser 15 is adjusted to produce a phase modulation depth, $\Delta\phi_o$, equal to 2.6 radians (rads) at the outputs of the interferometers 23 and 27.

For a frequency modulation sufficient to induce a phase modulation depth of $\Delta\phi_o = 2.6$ rads, the Bessel coefficients $J_1(\Delta\phi_o) =$ the Bessel coefficients $J_2(\Delta\phi_o)$ normalizing the peak amplitudes of the sine and cosine dependent components in the output of each of the interferometers 23 and 27. These Bessel coefficients are shown in equations [1] through [4].

As discussed above and shown in equations (1) through (4), the outputs of the detectors 31 and 33 include components at the fundamental ($\omega$) and second harmonic ($2\omega$) of the laser modulation frequency. These components contain sine and cosine signals which contain phase difference and phase noise signals in each of the interferometers 23 and 27.

To recover these sine and cosine signals in the $\omega$ and $2\omega$ components, the detected outputs of detectors 31 and 33 are respectively applied to synchronous detectors 43 and 45. Synchronous detector 43 is comprised of multipliers 47 and 49 and low pass filters (LPF) 48 and 50. Multiplier 47 multiplies the output from detector 31 with the fundamental frequency $\omega$ to synchronously detect the component at the fundamental frequency $\omega$, which is $\sin(\omega_s + \delta\phi_s)$. At the same time, multiplier 49 multiplies the output from detector 31 with the second harmonic $2\omega$ to synchronously detect the component at the second harmonic frequency $2\omega$, which is $\cos(\phi_s + \delta\phi_s)$. Low pass filters 48 and 50 only pass signals at frequencies less than $\omega$. Thus, the filters 48 and 50 only respectively pass the $\sin(\phi_s + \delta\phi_s)$ and $\cos(\phi_s + \delta\phi_s)$ signals.

Similarly, synchronous detector 45 is comprised of multipliers 51 and 53 and low pass filters 52 and 54. Multiplier 51 multiplies the output from detector 33 with the fundamental frequency $\omega$ to synchronously detect the component at the fundamental frequency $\omega$, which is $\sin(\phi_r + \delta\phi_r)$. At the same time, multiplier 53 multiplies the output from detector 33 with second harmonic $2\omega$ to synchronously detect the component at the second harmonic frequency $2\omega$, which is $\cos(\phi_r + \delta\phi_r)$. The low pass filters 52 and 54 only pass signals less than $\omega$. Thus, the filters 52 and 54 only respectively pass the sine $(\phi_r + \delta\phi_r)$ and $\cos(\phi_r + \delta\phi_r)$ signals.

The detection of the signals $\sin(\phi_s + \delta\phi_s)$ and $\cos(\phi_s + \delta\phi_s)$ from the synchronous detector 43 produces electrical signals respectively proportional to the sine and cosine of the $\phi_s$ phase terms of the sensor interferometer 23. Similarly, the detection of the signals $\sin(\phi_r + \delta\phi_r)$ and $\cos(\phi_r + \delta\phi_r)$ from the synchronous detector 45 produces electrical signals respectively proportional to the sine and cosine of the $\phi_r$ phase terms of the reference interferometer 27.

As a result of the path imbalance, $\Delta L$, in each of the sensor and reference interferometers 23 and 27, any instability in the emission frequency of the laser 15 produces phase noise in the outputs of the interferometers 23 and 27. Because of the equal path imbalances in the interferometers 23 and 27, the interferometers 23 and 27 have identical susceptibility to this frequency instability of the laser 15. Therefore, the interferometers 23 and 27 produce equal levels of phase noise ($\delta\phi_s$ and $\delta\phi_r$) in their outputs, as indicated in the electrical signal outputs of the synchronous detectors 43 and 45 of FIG. 1.

The sine and cosine signals, which contain phase terms and phase noise terms, are applied to a signal processor 55 which cancels the phase noise terms and only produces sine and cosine signal outputs $\sin(\phi_s - \phi_r)$ and $\cos(\phi_s - \phi_r)$, respectively. These $\sin(\phi_s - \phi_r)$ and $\cos(\phi_s - \phi_r)$ signals represent the sine and cosine components of the difference in the phase shift between the sensor and reference interferometers 23 and 27.

Figure 2:
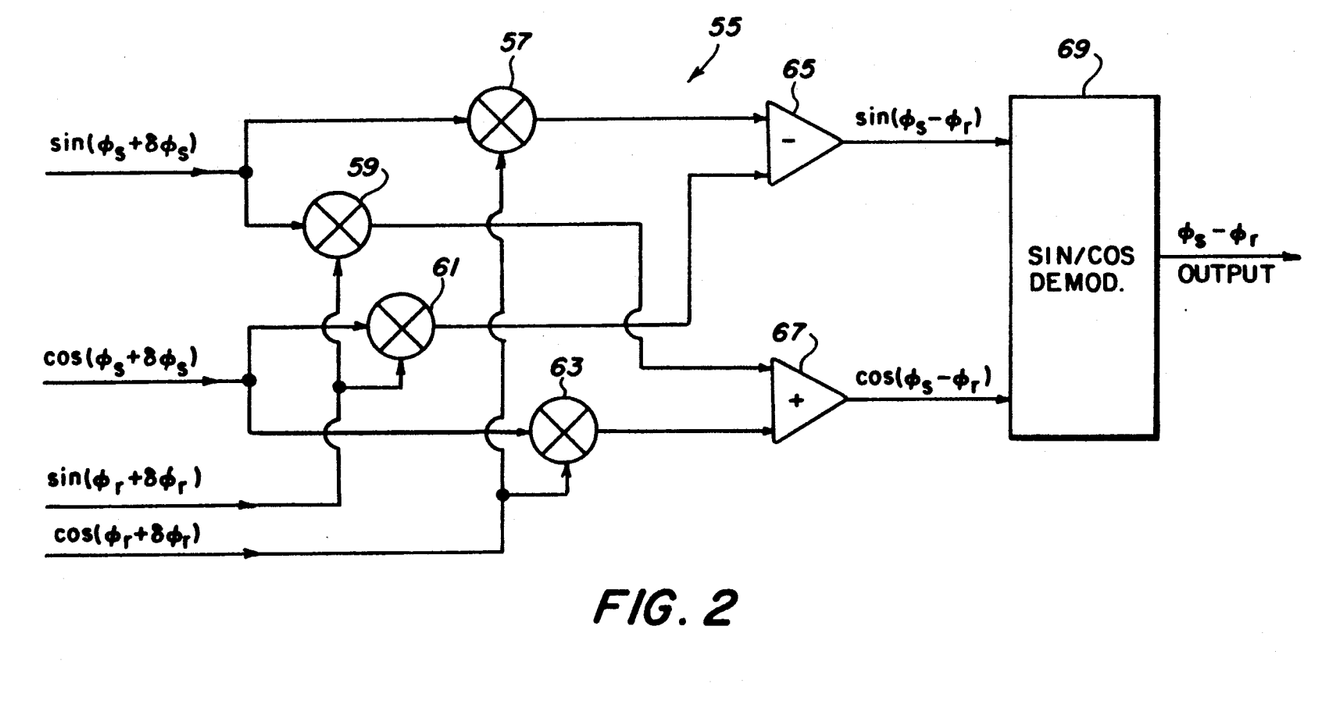
FIG. 2 is a schematic diagram oft he signal processor of FIG. 1 and further includes an optional sine/cosine demodulator.

Referring to FIG. 2, the signal processor 55 will now be discussed in greater detail. The sine and cosine pair of signals ($\sin[\phi_s + \delta\phi_s]$ and $\cos[\phi_s + \delta\phi_s]$), derived from the sensor interferometer 23 and containing phase terms $\phi_s$ and phase noise terms $\delta\phi_s$, as well as the sine and cosine pair of signals ($\sin[\phi_r + \delta\phi_r]$ and $\cos[\phi_r + \delta\phi_r]$), derived from the reference interferometer 27 and containing phase terms $\phi_r$ and phase noise terms $\delta\phi_r$, are applied to the signal processor 55. As shown in FIG. 2, the signal processor 55 is a sine/cosine cross multiplier circuit which is comprised of multipliers 57, 59, 61 and 63, a differential combiner 65 and a combiner 67. Essentially, the signal processor 55 cross multiplies the four input sine and cosine signals such that each of the sine and cosine signals derived from the sensor interferometer 23 is separately multiplied by each of the sine and cosine signals derived from the reference interferometer 27.

More specifically, the input signal $\sin[\phi_s + \delta\phi_s]$ is applied to each of the multipliers 57 and 59, the input signal $\cos[\phi_s + \delta\phi_s]$ is applied to each of the multipliers 61 and 63, the input signal $\sin[\phi_r + \delta\phi_r]$ is applied to each of multipliers 59 and 61, and the input signal $\cos[\phi_r + \delta\phi_r]$ is applied to each of the multipliers 57 and 63. The $\sin[\phi_s + \delta\phi_s]\cos[\phi_r + \delta\phi_r]$ product from the multiplier 57 and the $\cos[\phi_s + \delta\phi_s]\sin[\phi_r + \delta\phi_r]$ product from the multiplier 61 are differentially combined in the combiner 65 to develop a resultant output $S_a$, as shown in equation (5) below. In a similar manner, the $\cos[\phi_s + \delta\phi_s]\cos[\phi_r + \delta\phi_r]$ product from the multiplier 63 and the $\sin[\phi_s + \delta\phi_s]\sin[\phi_r + \delta\phi_r]$ product from the multiplier 59 are summed or combined in the combiner 67 to develop a resultant output $S_b$, as shown in equation (6) below.

$$S_a = \sin[\phi_s + \delta\phi_s]\cos[\phi_r + \delta\phi_r] - \cos[\phi_s + \delta\phi_s]\sin[\phi_r + \delta\phi_r] \quad (5)$$

$$S_b = \cos[\phi_s + \delta\phi_s]\cos[\phi_r + \delta\phi_r] + \sin[\phi_s + \delta\phi_s]\sin[\phi_r + \delta\phi_r] \quad (6)$$

Due to the trigonometric identities of:

$$\sin x \cos y - \cos x \sin y = \sin(x - y) \quad (7)$$

$$\cos x \cos y + \sin x \sin y = \cos(x - y) \quad (8)$$

the expressions shown in equations (5) and (6) can be expressed in the forms shown in equations (9) and (10) below (noting that $J_1(\Delta\phi_o) = J_2(\Delta\phi_o)$ for $\Delta\phi_o = 2.6$ rads)

$$S_a = 4[\eta I_o J_1(\Delta\phi_o)]^2 k_s k_r \sin[\phi_s - \phi_r + \delta\phi_s - \delta\phi_r] \quad (9)$$

$$S_b = 4[\eta I_o J_1(\Delta\phi_o)]^2 k_s k_r \cos[\phi_s - \phi_r + \delta\phi_s - \delta\phi_r] \quad (10)$$

It will be recalled that the interferometers 23 and 27 have substantially equal optical path differences (OPDs). As a result, the level of the phase noise induced into the interferometers 23 and 27 by the laser 15 is equal in both of the interferometers; i.e., $\delta\phi_s = \delta\phi_r$. Thus, the phase noise components $\delta\phi_s$ and $\delta\phi_r$ are cancelled from the sine and cosine dependent terms in equations (9) and (10). Consequently, after omitting the (constant) prefactors, equations (9) and (10) substantially reduce to the values sin $[\phi_s-\phi_r]$ and cos $[\phi_s-\phi_r]$, which are shown in FIG. 2 as the respective outputs of the combiners 65 and 67.

The sin $[\phi_s-\phi_r]$ and cos $[\phi_s-\phi_r]$ output signals from the signal processor 55 are sine and cosine components of the interferometric phase term $\phi_s-\phi_r$, and they are free of any phase noise produced by the frequency jitter of the laser 15. The signal sin $[\phi_s-\phi_r]$ varies as the sine of the phase difference between the interferometers 23 and 27, while the signal cos $[\phi_s-\phi_r]$ varies as the cosine of the phase difference between the interferometers 23 and 27.

In some applications, it may be necessary to obtain an output signal directly proportional to the phase difference, $\phi_s-\phi_r$, between the interferometers 23 and 25. Under such a requirement, the output signals from the signal processor 55 can be applied to a sine/cosine demodulator 69 to yield an output signal $\phi_s-\phi_r$ which is directly proportional to the phase difference between the interferometers 23 and 27. The sine/cosine demodulator 69 can be, for example, a differentiate cross multiplication demodulator or a synthetic heterodyne demodulator, both of which are well known in the art and require no further description.

It should be noted at this time that the phase term $\phi_r$, which is the phase difference between the arms of the reference interferometer 27, is a very slowly time-varying parameter and has no high frequency components because the reference interferometer 27 is shielded from measurand fields. As a result, the phase term $\phi_r$ has no detrimental effect on the measurable resolution of the phase term $\phi_s$, which carries the sensor information from the sensor interferometer 23.

Figure 3:
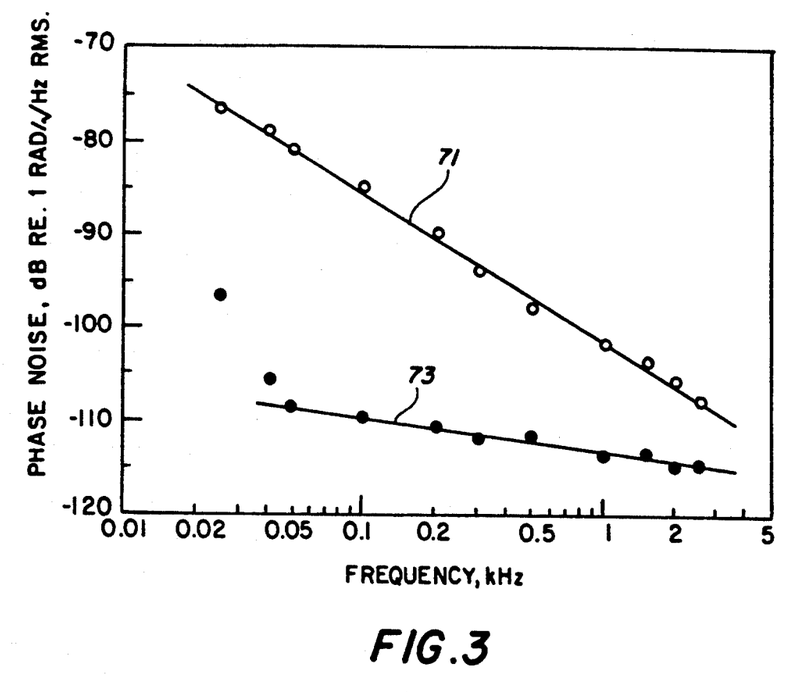
FIGS. 3 and 4 illustrate curves that are useful in explaining the phase noise cancelling operation of the invention.
Figure 4:
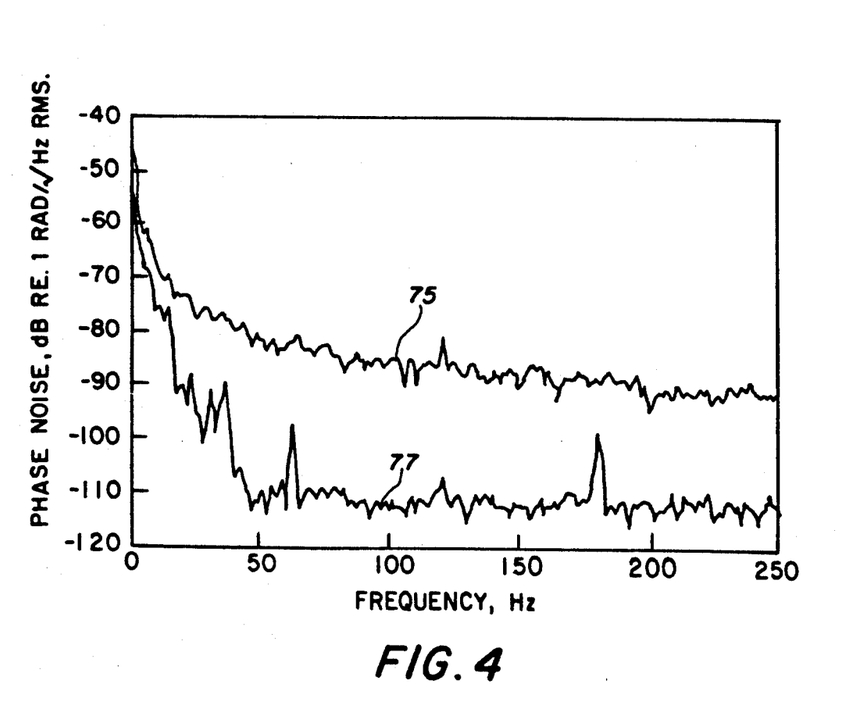

Referring now to FIGS. 3 and 4, the curves or traces shown illustrate the degree of phase noise reduction achieved in the operation of the invention.

In FIG. 3, curve 71 shows the phase noise at the output of the multiplier 47 in FIG. 1, which is essentially the sine dependent output of the sensor interferometer 23. Curve 71 clearly shows the level of phase noise that would be obtained from a prior art, unbalanced sensor interferometer without any phase noise cancellation. The curve 71 also exhibits the characteristic 1/F drop off in the amplitude of the noise power as frequency increases.

Curve 73 in FIG. 3 shows the phase noise obtained from the system of the invention at the output of the combiner 65 in the signal processor 55 of FIG. 2. Note that, after the cross multiplication of the sine/cosine components of the interferometers 23 and 27 according to equations (5) and (6), the observed phase noise at the output of the combiner 65 was found to be reduced and relatively flat across a wide band of frequencies from abut 50 Hz to about 2.5 kHz. Also note the reduction in the phase noise level of approximately 30 dB at a frequency of 50 Hz.

FIG. 4 shows the actual recorded noise reduction over the frequency band from 0 Hz to 250 Hz. Curve 75 shows the level of the phase noise at the output of the multiplier 47 in FIG. 1, while curve 77 shows the level of the phase noise at the output of the combiner 65 in the signal processor 55 of FIG. 2. The increase in phase noise below 30 Hz is due to the limitation of the interferometer shielding to environmental noise at very low frequencies.

Figure 5:
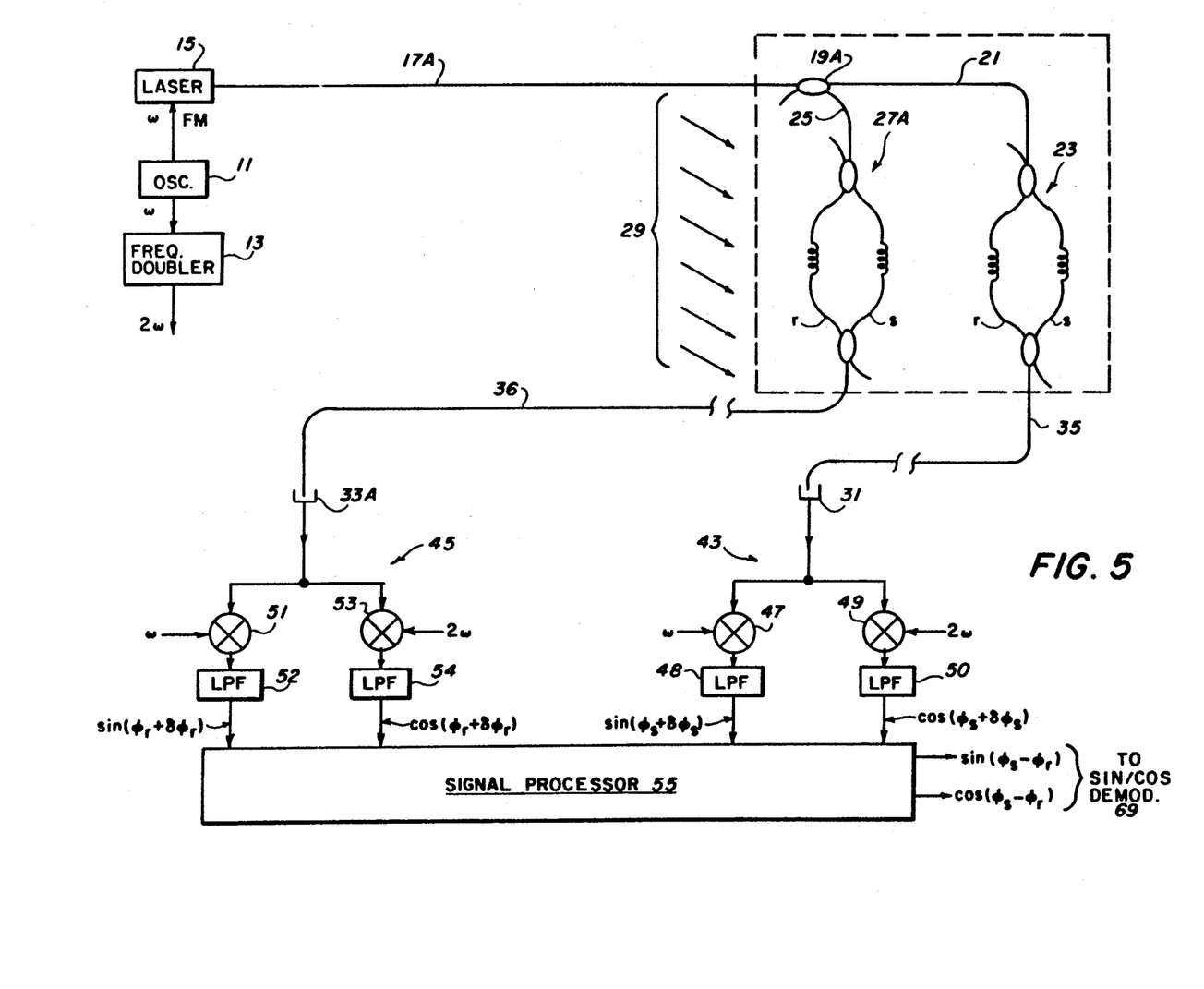
FIG. 5 is a schematic diagram of a second embodiment of the invention.

Referring now to FIG. 5, a second embodiment of the invention is illustrated. Although the structure of the embodiment of FIG. 5 is similar to the structure of the embodiment of FIG. 1, the operations of the two embodiments are different. Structurally, the embodiment of FIG. 5 differs from that of FIG. 1 in the following respects. The optical fiber 17, optical coupler 19, reference interferometer 27, and detector 33 of FIG. 1 are respectively replaced in FIG. 5 by a long optical fiber 17A, an optical coupler 19Aa, a second unbalanced, fiber optic sensor interferometer 27A (similar in structure and operation to the sensor interferometer 23 of FIG. 1), and a single-ended photodetector 33A. Also, in FIG. 5 there is an additional long optical fiber 36 coupled between the output of the sensor interferometer 27A and the photodetector 33A. All of the other elements in FIG. 5 are similar in structure and function to the remaining corresponding elements in FIG. 1 and, hence, require no further description.

The optical coupler 19A and the second sensor interferometer 27A are remotely positioned, with the second sensor interferometer 27A being positioned near the sensor interferometer 23, but disposed therefrom by a preselected distance D, in order to measure the same measurand field 29 that the sensor interferometer 23 measures. As will be explained, since the sensor interferometers 23 and 27A are positioned at different physical locations separated by the distance D, this enables the system to obtain a gradient measurement between the two measurements of the measurand field that were sensed by the interferometers 23 and 27A. Each of the sensor interferometers 23 and 27A is unbalanced and has an optical path difference (OPD) between their associated s and r arms of $\Delta L$.

In operation, the FM light beam from the laser 15 is applied by way of the long optical fiber 17A to the remotely positioned optical coupler 19A which splits the FM light beam into two portions. A first portion of the light beam is coupled into the sensor interferometer 23 by way of the optical fiber 21, while a second portion of the light beam is coupled into the second sensor interferometer 27A by way of the optical fiber 25. Each of the interferometers 23 and 27A produces an optical output which includes an optical interferometric signal (indicative of a change in the measurand field that it sensed) and a phase noise component produced by the frequency emission jitter of the laser 15. The optical outputs of the sensor interferometers 23 and 27A are respectively passed through the long optical fibers 35 and 36 to the respective locally positioned detectors 31 and 33A for photodetection of the optical outputs.

The operations of the synchronous detectors 43 and 45, signal processor 55 and sine/cosine demodulator 69 have been explained in the discussion of FIG. 1 and, hence, no further discussion of these components is needed.

It should be noted at this time that, although the second sensor interferometer 27A is not per se a reference interferometer, it performs a dual function. As stated before, the sensor interferometer 27A senses a change in a measurand field which produces a stress on its sensor arm s, and produces an optical output indicative of that change in the measurand field. However, the second sensor interferometer 27A also acts as a reference interferometer with respect to the sensor interferometer 23. Since the interferometers 23 and 27A have equal path imbalances of $\Delta L$, the interferometers 23 and 27A have the same susceptibility to any instability in the emission frequency of the laser 15. Therefore, the sensor interferometers 23 and 27A produce equal levels of phase noise in their outputs.

For purposes of this description of FIG. 5, the following terms in equations (3) and (4) will be redefined as follows:

subscript r refers to sensor interferometer 27A $\phi_r$ is the time-varying phase difference between the arms s and r of the sensor interferometer 27A $\eta$ is the detector responsivity (A/W) of detector 33A With the above terms redefined as indicated above, the equations (1)–(10) are applicable to the embodiment of FIG. 5. Now the term $\phi_s - \phi_r$ is dependent on the gradient in the measurand field sensed by the two sensor interferometers 23 and 27A, but the phase noise components $\delta\phi_s$ and $\delta\phi_r$ are still cancelled at the output of the signal processor 55.

Therefore, what has been described is a system for cancelling phase noise in an interferometric fiber optic apparatus. The system basically involves the use of first and second unbalanced interferometers each having an optical path difference (OPD) of $\Delta L$ between its associated s and r arms; phase generated carrier (PGC) passive homodyne phase detection to obtain sine/cosine components from the outputs of the two interferometers; and a signal processor for cross-multiplying the sine-cosine components to provide cancellation of the phase noise while only producing sine and cosine components of either the difference in the phase shift between the two unbalanced interferometers in a first embodiment or the difference between the measurand fields sensed by the two unbalanced interferometers (i.e., the gradient in the measurand field) in a second embodiment. The system may further include a sine/cosine demodulator which is responsive to the sine and cosine components from the signal processor for producing an output signal directly proportional to either the phase shift difference between the two unbalanced interferometers in the first embodiment or the difference between the measurand fields sensed by the unbalanced interferometers in the second embodiment.

It should therefore be readily understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A system for cancelling phase noise in a interferometric fiber optic sensor arrangement due to laser emission-frequency jitter, said system comprising:

a laser for providing a laser emission at a first frequency;

means coupled to said laser for frequency modulating the laser emission at a fundamental frequency to generate a phase shift carrier signal;

first and second interferometers each having first and second arms with an optical path difference between said first and second arms of $\Delta L$, each of said first and second interferometers being responsive to the phase shift carrier signal for developing an optical output which, at the fundamental frequency and the second harmonic of the fundamental frequency, contains sine and cosine components of phase difference and phase noise terms;

detection means responsive to said fundamental and second harmonic frequencies and to said optical outputs from said first and second interferometers for producing a plurality of sine and cosine signals containing phase difference and phase noise components; and signal processing means responsive to the plurality of sine and cosine signals for cancelling the phase noise components and only producing output sine and cosine components of the difference in the phase shift between said first and second interferometers.

2. The system of claim 1 further including:

means for demodulating said sine and cosine components to produce an output signal proportional to the phase shift difference between said first and second interferometers.

3. The system of claim 1 wherein:

said first interferometer is remotely disposed in an environment to sense a measurand field; and said second interferometer is isolated from said measurand field.

4. The system of claim 1 wherein:

said first and second interferometers are remotely disposed at different locations in a common environment to sense a measurand field from different locations in order to establish a gradient measurement therebetween while also cancelling phase noise in said gradient measurement.

5. The system of claim 2 wherein:

said demodulating means is a differentiate-cross multiply circuit.

6. The system of claim 1 wherein:

each of said first and second interferometers is an unbalanced Mach Zehnder interferometer.

7. The system of claim 1 further including:

means for coupling first and second portion of the frequency modulated light from said laser into said first and second interferometers, respectively.

8. The system of claim 1 wherein said frequency modulating means includes:

an oscillator for generating said fundamental frequency; and a frequency doubler responsive to said fundamental frequency for generating the second harmonic of said fundamental frequency.

9. The system of claim 1 wherein said detection means include:

first and second photodetection means for respectively converting the optical outputs of said first and second interferometers into respective first and second electrical signals; and means for synchronously detecting said first and second electrical signals to develop sine and cosine components of phase difference and phase noise terms in each of said first and second electrical signals.

10. The system of claim 1 wherein:

said signal processing means includes a sine/cosine cross-multiplier circuit.

11. The system of claim 1 wherein:

each of said first and second interferometers is an unbalanced Mach Zehnder interferometer;

said detection means includes first and second photodetection means for respectively converting the optical outputs of said first and second interferometers into respective first and second electrical signals and means for synchronously detecting said first and second electrical signals to develop sine and cosine components of phase difference and phase noise terms in each of said first and second electrical signals; and said signal processing means includes a sine/cosine cross-multiplier circuit.

12. The system of claim 11 further including:

means for demodulating said sine and cosine components to produce an output signal proportional to the phase shift different between said first and second interferometers.

13. The system of claim 12 wherein:

said demodulating means is a sine/cosine demodulator.

14. The system of claim 13 wherein:

said sine/cosine demodulator is a differentiate-cross-multiply demodulator.

15. A fiber optic sensor system for cancelling phase noise while it senses a measurand field, said system comprising:

means for developing a light beam frequency modulated at a fundamental frequency;

first and second unbalanced interferometers having equal path imbalances and being responsive to said frequency modulated light beam for producing associated optical outputs;

means for synchronously detecting the optical outputs of said first and second unbalanced interferometers for developing sine and cosine components of phase difference and phase noise terms in each of said first and second interferometers; and means for selectively cross-multiplying said sine and cosine components to cancel all phase noise components and only produce sine and cosine components of the difference in the phase shift between said first and second unbalanced interferometers.

16. The system of claim 15 further including:

means for demodulating said sine and cosine components to produce an output signal proportional to the phase shift difference between said first and second interferometers.

17. A fiber optic sensor system for cancelling phase noise while it senses a measurand field, said system comprising:

means for developing a light beam frequency modulated at a fundamental frequency, said developing means including optical means for providing a light beam at a first frequency and oscillator means coupled to said optical means for frequency modulating the light beam at the fundamental frequency;

first and second unbalanced interferometers having equal path imbalances and being responsive to said frequency modulated light beam for producing associated optical outputs;

means for synchronously detecting the optical outputs of said first and second unbalanced interferometers for developing sine and cosine components of phase difference and phase noise terms in each of said first and second interferometers, said synchronously detecting means including first and second photodetection means for respectively converting the optical outputs of said first and second interferometers into respective first and second electrical signals, and first and second synchronous detectors responsive to said first and second electrical signals and to said fundamental frequency and the second harmonic of said fundamental frequency for developing said sine and cosine components of phase difference and phase noise terms in each of said first and second electrical signals; and means for selectively cross-multiplying said sine and cosine components to cancel all phase noise components and only produce sine and cosine components of the difference in the phase shift between said first and second unbalanced interferometers, said selectively cross-multiplying means being a sine/cosine cross-multiplier circuit.

18. The system of claim 17 further including:

means for demodulating said sine and cosine components to produce an output signal proportional to the phase shift difference between said first and second interferometers.

19. The system of claim 18 wherein:

said demodulating means is a sine/cosine demodulator.

* * * * *